(12) United States Patent
Rozmus

(10) Patent No.: US 7,466,052 B2
(45) Date of Patent: Dec. 16, 2008

(54) BEARING ASSEMBLY HAVING A MECHANICAL COMPONENT AND USING ATTRACTIVE MAGNETIC FORCES

(75) Inventor: John J. Rozmus, Berwyn, PA (US)

(73) Assignee: Rozlev Corp., LLC, Media, PA (US)

( * ) Notice: Subject to any disclaimer, the term of this patent is extended or adjusted under 35 U.S.C. 154(b) by 0 days.

(21) Appl. No.: 11/970,316

(22) Filed: Jan. 7, 2008

(65) Prior Publication Data

US 2008/0106165 A1    May 8, 2008

Related U.S. Application Data

(62) Division of application No. 11/027,510, filed on Dec. 30, 2004, now Pat. No. 7,327,060.

(51) Int. Cl.
*H02K 7/09* (2006.01)

(52) U.S. Cl. .......................................... 310/90.5; 310/90

(58) Field of Classification Search ................ 310/90, 310/90.5, 67 R
See application file for complete search history.

(56) References Cited

U.S. PATENT DOCUMENTS

| | | | |
|---|---|---|---|
| 833,635 | A | 10/1906 | Rogers |
| 1,331,039 | A | 2/1920 | Zoelly |
| 3,125,964 | A | 3/1964 | Silverman |
| 3,476,449 | A | 11/1969 | Chaboseau et al. |
| 3,493,274 | A | 2/1970 | Emslie et al. |
| 3,664,268 | A | 5/1972 | Lucas et al. |
| 3,780,668 | A | 12/1973 | Schwärzler et al. |
| 3,877,761 | A | 4/1975 | Boden et al. |
| 4,062,097 | A | 12/1977 | Riihinen |
| 4,167,295 | A | 9/1979 | Glaser |
| 4,180,946 | A | 1/1980 | Heijkenskjolde et al. |

(Continued)

FOREIGN PATENT DOCUMENTS

AT    92424    5/1923

(Continued)

OTHER PUBLICATIONS

A. V. Nikitin et al., "Magnetic Relieving of Guides Used in Automated Machining Systems," *Russian Engineering Research*, 12 (1992) No. 9, New York, US.

*Primary Examiner*—Nguyen N Hanh
(74) *Attorney, Agent, or Firm*—RatnerPrestia

(57) ABSTRACT

A magnetic bearing assembly, either radial or linear, utilizes attractive magnetic forces between inner and outer components of the assembly. The assembly includes a mechanical device for controlling relative movement between the components in first and second directions, while permitting relative movement between them in a third direction. At least one of the components, separated by a gap, has a magnetic source for creating a magnetic field extending across the gap and causing a first load in a direction opposing gravity exerted across the gap and against that component adapted to receive a supplemental load. In this way, the attractive force urges the component adapted to receive the supplemental load upward against the mechanical device, thereby at least partially offsetting the load on the mechanical device caused by the weight of the supplemental load. Either component may be the moving component or the one adapted to receive the supplemental load.

12 Claims, 12 Drawing Sheets

U.S. PATENT DOCUMENTS

| | | | |
|---|---|---|---|
| 4,259,908 A | 4/1981 | Feistkorn et al. | |
| 4,387,935 A | 6/1983 | Studer | |
| 4,467,968 A | 8/1984 | Morishita et al. | |
| 4,482,828 A * | 11/1984 | Vergues et al. | 310/83 |
| 4,896,065 A | 1/1990 | Tsuyama | |
| 5,036,235 A | 7/1991 | Kleckner | |
| 5,220,222 A | 6/1993 | Shtipelman | |
| 5,789,837 A * | 8/1998 | Shin et al. | 310/90.5 |
| 5,836,739 A | 11/1998 | Haramura et al. | |
| 6,491,441 B2 | 12/2002 | Vignotto et al. | |
| 6,720,695 B2 | 4/2004 | Coenen | |
| 6,727,617 B2 | 4/2004 | McMullen et al. | |
| 6,836,036 B2 | 12/2004 | Dubé | |
| 7,001,258 B2 | 2/2006 | Higuchi | |
| 2003/0042812 A1 | 3/2003 | Post | |
| 2003/0110696 A1 | 6/2003 | Rennetaud et al. | |
| 2004/0107863 A1 | 6/2004 | Falter et al. | |
| 2004/0113502 A1 | 6/2004 | Li et al. | |
| 2004/0123766 A1 | 7/2004 | van den Bergh et al. | |
| 2007/0273219 A1 | 11/2007 | Shimada | |

FOREIGN PATENT DOCUMENTS

| | | |
|---|---|---|
| CH | 527 379 | 8/1972 |
| DE | 57447 C | 9/1890 |
| DE | 2 136 798 | 2/1973 |
| DE | 30 04 591 A1 | 8/1981 |
| DE | 38 10 338 A1 | 10/1989 |
| DE | 41 16 212 A1 | 11/1992 |
| FR | 2.050.538 | 4/1971 |
| JP | 55-006056 A | 1/1980 |
| JP | 55-123025 A | 9/1980 |
| JP | 62-165019 | 7/1987 |
| SU | 1362510 A1 | 12/1987 |
| WO | WO-2004/007984 A1 | 1/2004 |

* cited by examiner

BEARING ASSEMBLY HAVING A MECHANICAL COMPONENT AND USING ATTRACTIVE MAGNETIC FORCES

CROSS-REFERENCE TO RELATED APPLICATIONS

This application is a divisional application of U.S. patent application Ser. No. 11/027,510, filed Dec. 30, 2004, the entirety of which is incorporated herein by reference.

TECHNICAL FIELD

The present invention relates generally to bearing assemblies having a mechanical component and a magnetic component. More particularly, the present invention relates to radial bearing assemblies, suitable for use in a vehicular wheel, and linear bearing assemblies, suitable for use in connection with a rail line.

BACKGROUND OF THE INVENTION

Bearings which are solely mechanical necessarily involve mechanical contact between the components, leading to well-known problems associated with friction, leading to wear and energy losses. Repulsive magnetic forces have been utilized in magnetic bearings, for example, to provide a non-contact, low-friction bearing. However, repulsive forces in general are not as strong as attractive magnetic forces with all other parameters being the same. The use of attractive magnetic forces in a bearing assembly raises a concern that the bearing assembly may become unstable in the direction of the attractive forces. In particular, there is a concern that the two magnetic components will come into contact with one another due to an increased attractive force at a particular point.

SUMMARY OF THE INVENTION

According to an embodiment of the present invention, a bearing assembly has an inner magnetic component, at least one outer magnetic component, and a mechanical device for controlling relative movement between the inner component and the at least one outer component in first and second directions while permitting relative movement between the inner component and the at least one outer component in a third direction. At least one of the inner component or the at least one outer component comprises a magnetic source. The components together define at least one magnetic gap at which attractive magnetic forces cause a first load in a direction opposing gravity to be exerted across the gap and against the component adapted to receive a supplemental load, thereby urging the component adapted to receive the supplemental load upward against the mechanical device.

In a further embodiment according to the present invention, the bearing assembly is a radial bearing assembly and comprises a radially inner component having an axis and a radially outer component disposed for relative rotation with the radially inner component around the axis. One of the radially inner component and the radially outer component is a rotating component and the other is a stationary component. At least one of the radially inner component and the radially outer component comprises a magnetic source and the other component comprises a highly magnetically permeable material. The radially inner component and the radially outer component are positioned to provide an annular gap across which a magnetic field, formed from the magnetic moment, imparts a magnetic attractive force between the radially inner component and the radially outer component. The bearing assembly also includes a set of mechanical bearings coupled to the radially inner component and the radially outer component for allowing relative rotation between the components and for axially aligning the components. The components are configured to exert against the set of mechanical bearings a first load in a first direction opposing gravity across the gap and against the component adapted to receive a supplemental load. The assembly also includes means, attached to the component adapted to receive the supplemental load, for accepting a supplemental component providing the supplemental load on that component in a second direction opposite the first direction to oppose the first load.

In a further embodiment according to the present invention, the bearing assembly is a linear bearing assembly and comprises a longitudinally-extending inner component, at least one longitudinally-extending outer component, a housing, and means for controlling lateral and vertical movement between the inner component and the at least one outer component. The inner component comprises at least one member having a top engaging surface, a bottom engaging surface, and at least one magnetic surface (which may also serve as an engaging surface), and has at least two side engaging surfaces and an axis. The at least one outer component has at least one magnetic surface and is disposed for relative longitudinal movement with the inner component along the axis. One of the inner component and the at least one outer component is a moving component, and the other is a stationary component. At least one of the inner component and the at least one outer component comprise a magnetic source disposed to provide a magnetic moment and the other component comprises a highly magnetically permeable material. The inner component and the at least one outer component are positioned to provide at least two gaps defined by the magnetic surfaces of the components. Across the gaps, a magnetic field, formed from the magnetic moment, imparts a magnetic attractive force between the inner component and the at least one outer component and causes a first load in a first direction opposing gravity to be exerted across the gap and against the component adapted to receive a supplemental load. The housing is connected to each of the at least one outer component for allowing relative longitudinal movement between the outer and the inner components.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing, in which similar elements among the embodiments have reference numerals ending with the same digits. It is emphasized that, according to common practice, the various features of the drawing are not to scale. Included in the drawing are the following figures.

DETAILED DESCRIPTION OF THE INVENTION

A general embodiment of the present invention is directed to the utilization of attractive magnetic forces of magnetic components of a bearing assembly. A bearing assembly may consist only of the two components of the bearing which move relative to one another or it may include the two components and other elements, such as a mechanical bearing or similar device for controlling movement in one or more directions, shaft, a housing, a carriage which might be mounted to the housing, a base, or other known elements of bearing assemblies having both magnetic and mechanical components. The magnetic bearing according to the present invention can be used in a wide variety of industrial applications requiring a bearing assembly and can be in the form of a radial bearing assembly or a linear bearing assembly. The radial bearing assembly can be used in connection with a vehicle, such as a bicycle or an automotive vehicle, and the linear bearing assembly can be used in connection with a train or other rail transportation system.

According to a general embodiment of the invention, a bearing assembly has an inner magnetic component and at least one outer magnetic component. The components are the pieces of the bearing assembly which move relative to one another and either provide a magnetic field or are least capable of being magnetized. The assembly also includes some sort of mechanical device, such as a set of bearings, wheels exerting force on one of the components, or flanges, for controlling relative movement between the components in first and second directions while permitting movement between the components in a third direction. The types of magnetic bearings according to the present invention include radial bearings, in which case the direction of relative movement of the components is rotational, and linear bearings, in which case the direction of relative movement of the components is longitudinal movement. At least one of the inner components or the outer components comprises a magnetic source. As used herein, a magnetic source (or source of magnetism) is either a permanent magnet material or an electromagnet. In the case of an electromagnet, preferably a direct current source of power is used. As is well known, an electromagnet comprises a core of highly magnetically permeable material and a coil of wire wound on the core, and the core is magnetized by passing a current through the coil of wire. The two components define at least one magnetic gap at which attractive magnetic forces cause a first load in a direction opposing gravity to be exerted across the gap and against whichever component is adapted to receive a supplemental load. This attractive magnetic force urges the component adapted to receive the supplemental load upward against the mechanical device (and thus upward against the supplemental load, which is typically the weight of a supplemental device).

Figure 1A:
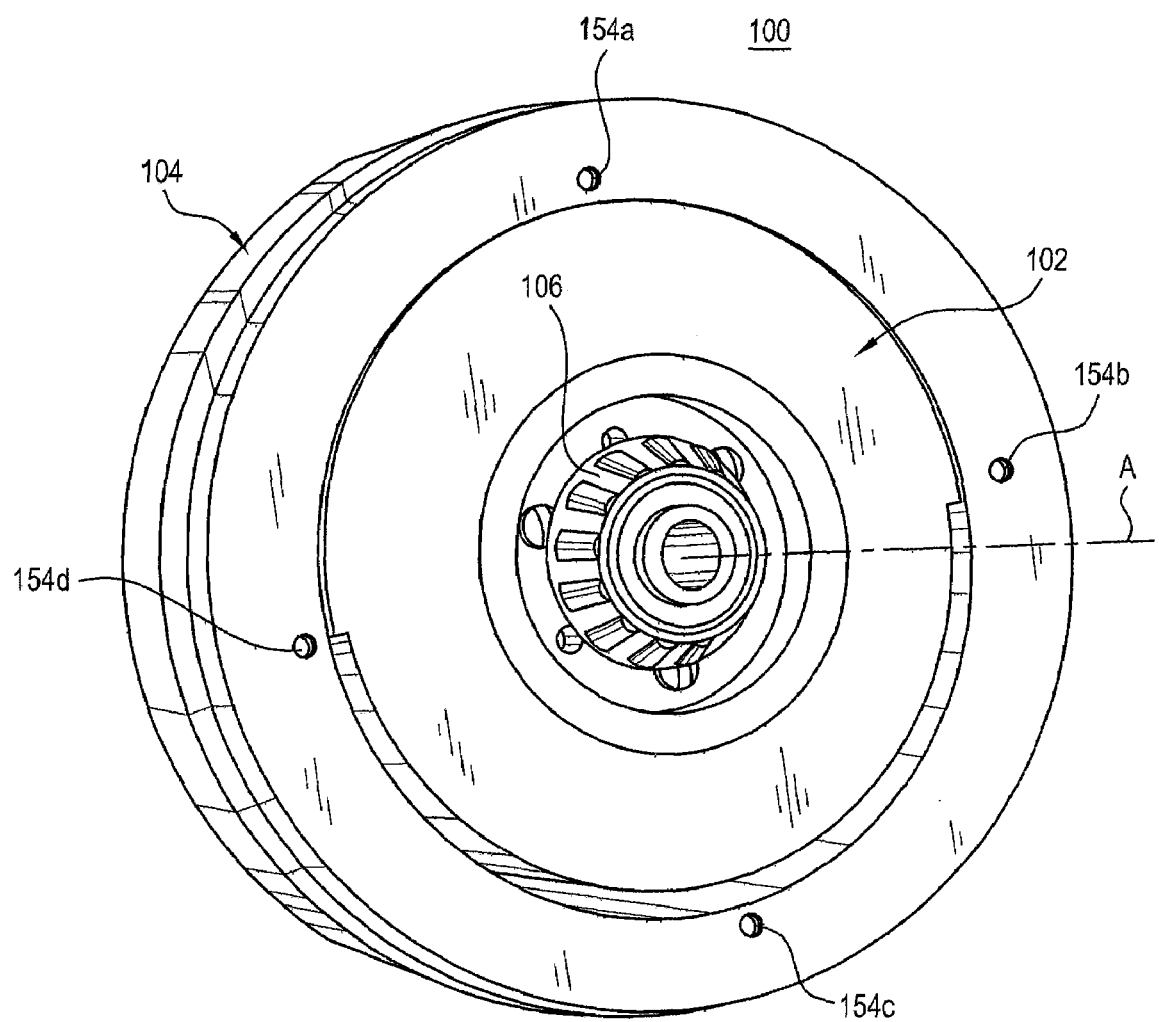
FIG. 1A is a perspective view of certain parts of a radial bearing assembly according to an embodiment of the present invention without the mechanical bearing acting on the magnetic components.

FIG. 1A shows a radially bearing assembly 100 comprising radially inner component 102 having an axis A, which is the central axis of the radially inner component. Bearing assembly 100 also comprises a radially outer component 104 which is disposed for relative rotation with the radially inner component around the axis. As such, either radially inner component 102 or radially outer component 104 may be a rotating component while the other is a stationary component. FIG. 1A shows the position of radially inner component 102 with respect to radially outer component 104 without any external force acting on the components by a mechanical device, such as a set of mechanical bearings. In particular, due to the attractive forces existing between the two components (for reasons discussed below), the components move relative to one another such that, at the closest areas of contact, the components engage one another which causes the gap at the opposite end between the two components to widen. In particular, the upper quadrants of radially inner component 102 and radially outer component 104 are touching one another while the space between the two components at the lower quadrants is increased. Of course, the embodiment shown in FIG. 1A could not be used as a bearing but is being shown merely to explain how the attractive magnetic forces between the two components would act in the absence of a set of mechanical bearings.

Figure 1B:
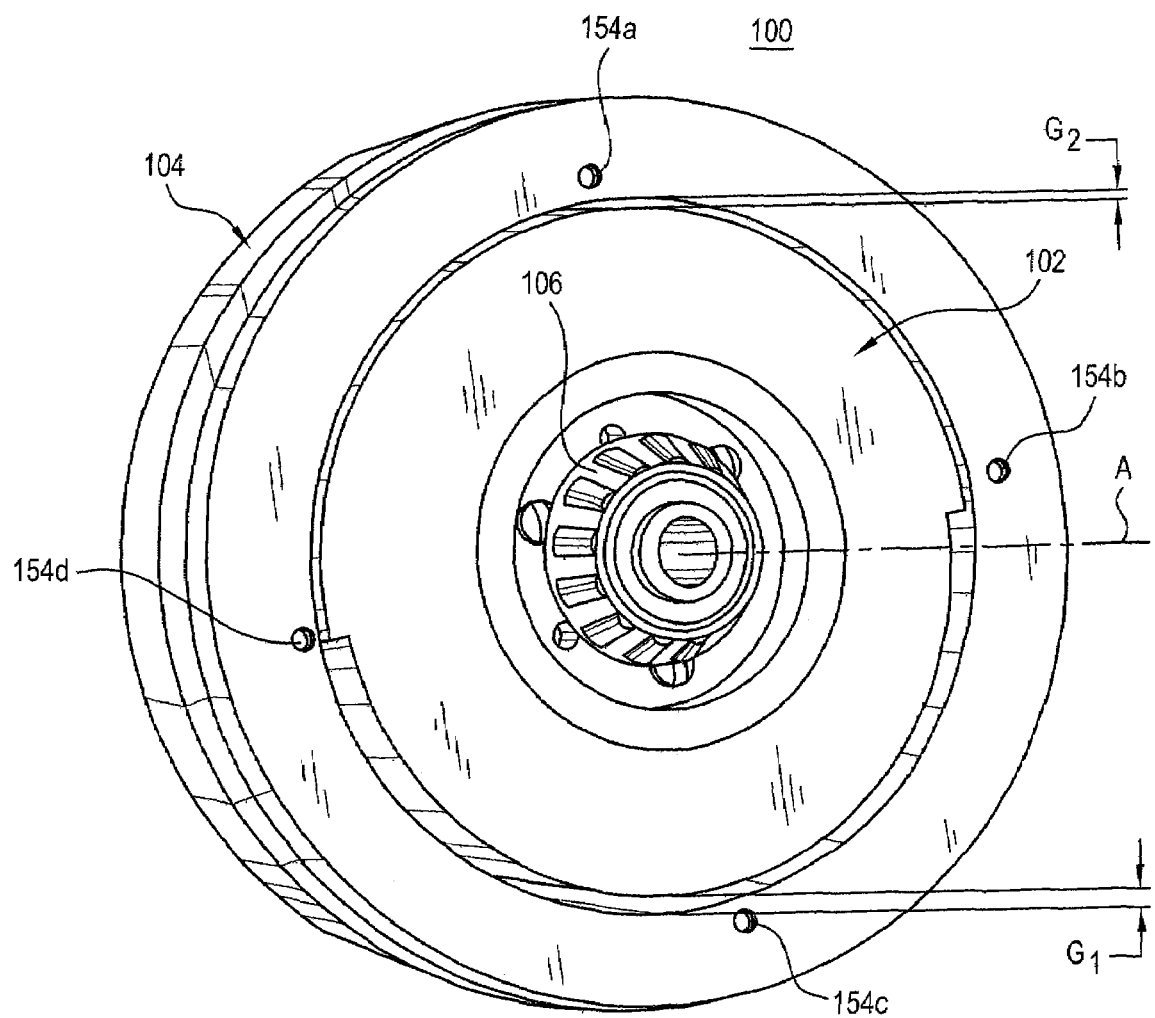
FIG. 1B is a perspective view of the same parts of the radial bearing assembly shown in FIG. 1A but showing how the mechanical bearings influence the magnetic components of the radial bearing assembly.

On the other hand, the view shown in FIG. 1B shows the relative orientation of radially inner component 102 and radially outer component 104 after being acted upon by a mechanical device, such as a set of mechanical bearings. The bearings or other mechanical device (not shown in FIG. 1B) serve to orient the components relative to one another such that the space between the two components in one quadrant (e.g., $G_2$ at the upper quadrant) is less than the space between two components at another quadrant (e.g., $G_1$ of the lower quadrant). As used herein, the term "quadrant" shall mean an arcuate portion of the gap between the two components and could be up to half of the arc of the gap or one quarter of the arc of the gap or something less. Accordingly, it can be appreciated that if an attractive magnetic force exists between the components and the radially inner component is the stationary component in FIG. 1B, then a net force acting upward as shown in FIG. 1B would be acting on radially inner component 102.

Figure 2:
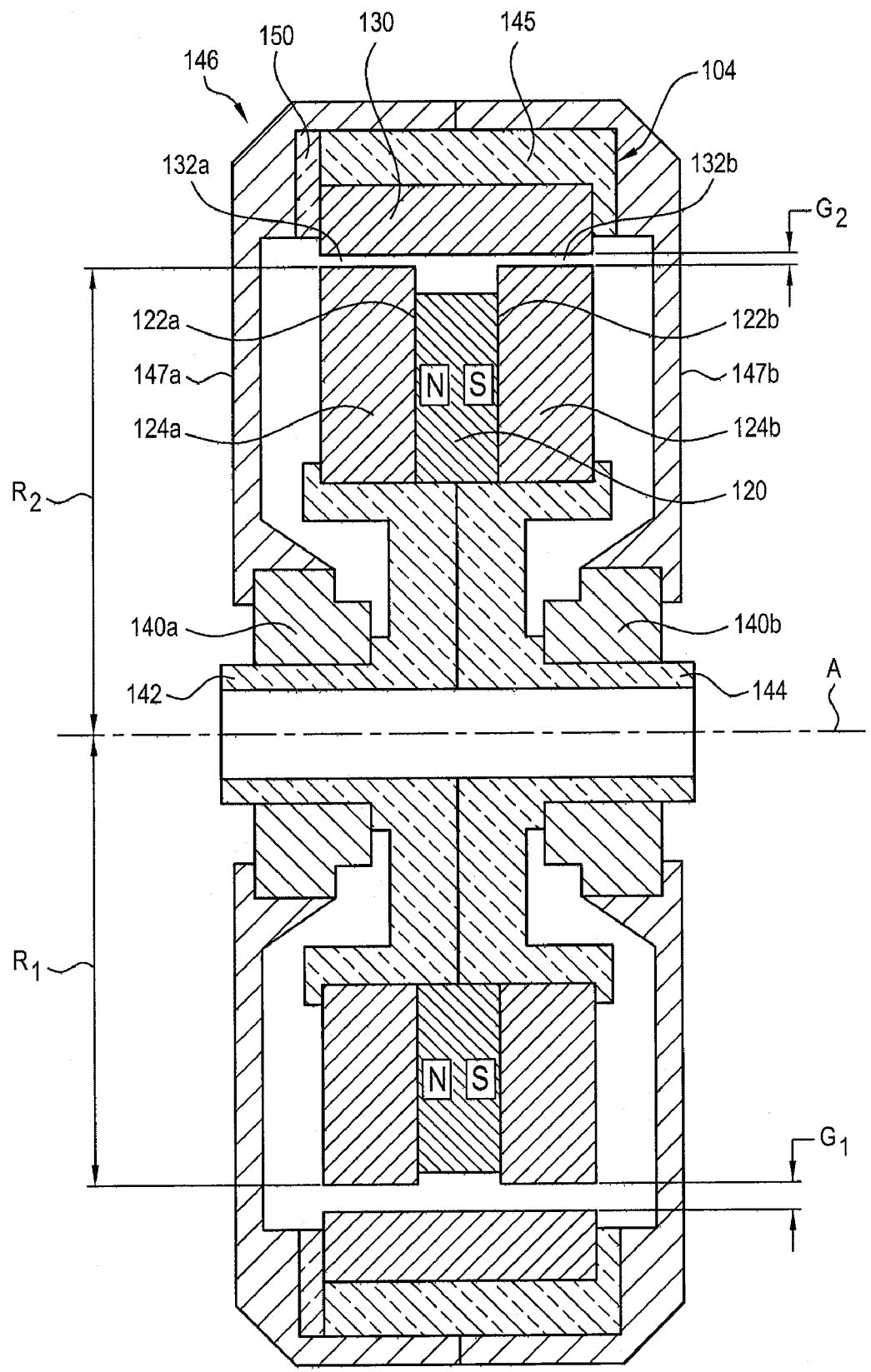
FIG. 2 is a radial cross-sectional view of the radial bearing assembly incorporating the parts shown in FIGS. 1A and 1B.

FIG. 2 shows the radial bearing assembly of FIGS. 1A and 1B in a radial cross-sectional view. As shown in FIG. 2, radially inner component 102 comprises a magnetic source 120 which is disposed to have a magnetic moment in the axial direction, as shown for example by the polarities north and south in FIG. 2. Magnetic source 120 may either be a permanent magnetic material or an electromagnetically excited material. If a permanent magnetic material is used, any known material, such as non-rare earth permanent magnets or rare earth magnets may be used. Non-rare earth magnets include alnico (aluminum-nickel-cobalt), and rare earth magnets include neodymium-iron-boron and samarium-cobalt magnets. The material used will depend on the needs of the particular application, and it is well within the knowledge of one having ordinary skill in the art to select a suitable material. The components might also include a surface coating to serve as a protective layer, which is also well-known in the art. On the other hand, if magnetic source is an electromagnetically excited material, magnetic source 120 would include a core of highly magnetically permeably material and a coil of wire wound around the core, with the core capable of being magnetized by passing a current through the coil of wire.

Radially inner component also includes a first pole piece 124a and a second pole piece 124b. First pole piece 124a is in magnetic contact with the magnetic source at a first axial end 122a of magnetic source 120, while second pole piece 124b is in magnetic contact with the magnetic source at a second axial end 122b of the magnetic source. As noted above, first axial end 122a of magnetic source 120 has a first polarity (e.g., north), and second axial end 122b of the magnetic source has a second polarity (e.g., south) opposite the first polarity. First pole piece 124a and second pole piece 124b are made of a highly magnetically permeable material. A highly magnetically permeable material is one which readily conducts a magnetic field. Knowledge of and the selection of the particular highly magnetically permeable material to be used is well within the skill of an artisan in the field. Such a material selected should be sufficiently magnetically permeable to conduct the magnetic field from magnetic source 120 in a way which permits an adequate magnetic force between the two components of the bearing assembly for the particular application at hand. Typically, such materials include iron, nickel iron, or low carbon steel.

In the embodiment shown in FIGS. 1A, 1B, and 2, radially inner component 102 is a stationary component and radially outer component 104 is the moving (or rotating) component. In this embodiment, radially inner component 102 has a reduced radius $R_1$ at its lower quadrant (as shown best in FIG. 2) when compared with the radius $R_2$ at its upper quadrant. This has the effect of making the annular gap $G_1$ at the lower quadrant wider than the annular gap $G_2$, which is at the top quadrant. As radially outer component 104 also includes a highly magnetically permeable material 130, a magnetic field is thereby created between radially inner component 102 and radially outer component 104. This field may be viewed as extending from first axial end 122a of magnetic source 120, across first pole piece 124a, across a first annual gap 132a defined by first pole piece 124a and highly magnetically permeable material 130 of radially outer component 104, across highly magnetically permeable material 130 of radially outer component 104, across a second annular gap 132b defined by second pole piece 124b and highly magnetically permeable material 130 of radially outer component 104, and then back to magnetic source at the second axial end 122b. Because of the difference in gap widths of $G_1$ and $G_2$, however, it can be appreciated that a greater attractive force exists between the two components at the upper quadrant than at the lower quadrant. The magnitude of this attractive force can be adjusted by varying the difference between the gap widths at these two quadrants ($G_1-G_2$) as well as by the selection of the materials.

Bearing assembly 100 also includes a set of mechanical bearings 140a and 140b. In an embodiment in which radially bearing assembly 100 is used for allowing rotation of a wheel relative to a shaft of a vehicle, mechanical bearings are tapered roller bearings. As can be seen from FIG. 2, mechanical bearings 140a and 140b are coupled to radially inner component 102 along at least one edge of a spindle 142 which is mounted to a shaft 144. Mechanical bearings 140a and 140b are also coupled to radially outer component 104 along at least one edge of a housing 146. Spindle 142 is rigidly mounted to radially inner component 102, and housing 146 is rigidly mounted to radially outer component 104. To maintain the magnetic field, spindle is a non-magnetic material, such as brass, and a non-magnetic material portion 145 and a spacer 150 (also non-magnetic) surround the highly magnetically permeable material 130 of radially outer component 104. In this embodiment, both non-magnetic material portion 145 and spacer 150 are part of radially outer component 104, but the radially outer component may consist solely of the highly magnetically permeable material. Although not shown, mechanical bearings 140a and 140b can be placed elsewhere so that they directly engage radially inner component 102 and radially outer component 104.

Mechanical bearings 140a and 140b serve to axially and radially align radially inner component 102 and radially outer component 104 with respect to one another. As used in connection with this embodiment, reference to the axial direction (such as in "axially aligned") means the direction along axis A. Accordingly, as shown, the axially outer edges of pole pieces 124a and 124b are in line with the axially outer edges of highly magnetically permeable material 130 of radially outer component 104. Mechanical bearing 140a and 140b radially align radially inner component 102 and radially outer component 104 by setting the width of gaps $G_1$ and $G_2$. The desired radial clearance between the two components can be selected readily and depends upon the magnetic materials being used, the force desired, and manufacturing tolerances. As can be appreciated, radially inner component 102 and radially outer component 104 are configured to exert against the mechanical bearings a first load in a first direction opposing gravity exerted by the moving component across the gap and against the stationary component. Accordingly, when the mechanical bearings are not present, the configuration shown in FIG. 1A results.

Bearings assembly 100 also includes means for accepting a supplemental component which provides a supplemental load on a component adapted to receive the supplemental load, namely either radially inner component 102 or radially outer component 104. In the embodiment shown in FIG. 2, radially inner component 102 is the component adapted to receive the supplemental load, which might be, for example, one-half of the weight of a bicycle and rider or one-quarter the weight of a car and passengers (in both cases, excluding the wheels). As shown in FIG. 2, the items for accepting the supplemental load would include a shaft 144 which is attached to radially inner component 102 by spindle 142. The items for accepting the supplemental load could also include any type of fastener for mounting the supplemental component to the stationary component. This could include a bracket, grip, fastener (such as a screw, bolt, and/or nut, as needed) which may or may not be mounted to the shaft.

As mentioned above, the embodiment shown in FIGS. 1A, 1B, and 2 may be applicable, for example, for a bicycle wheel, in which case the radially outer component 104 is directly coupled to part of the wheel (e.g., by affixing housing 146 to the wheel hub or rim) and radially inner component 102 is coupled to the frame of the bicycle in a known manner. By imparting a force against the weight of the component adapted to receive the weight of the bicycle (or an automotive vehicle), the bearing assembly of the present invention significantly reduces the load on the mechanical bearings and, consequently, significantly reduces the frictional losses associated with the mechanical bearings. Accordingly, the radial bearing assembly of the present invention should lead to increased gas mileage for automotive vehicles and allow an operator of a bicycle to expend less energy to cover the same distance. For braking, a brake pad may be mounted to the shaft or some other stationary component of the vehicle and then engage against a surface of the radially outer component 104 or housing 146 or the wheel itself (not shown).

An alternative embodiment can be easily adapted in which radially inner component 502 is the moving component and radially outer component 504 is the stationary component. This may be suitable, for example, for driving a fly wheel attached to radially inner component 502, as shown in FIGS. 5A, 5B, 5C, and 6. In this embodiment, the radially outer component would have a decreased annular height at the lower quadrant, and the radially inner component would have the same radius around its circumference. With this configuration, an increased attractive magnetic force would exist between the components at the upper quadrant, thereby offsetting some of the weight of the fly wheel.

While the embodiment shown in FIGS. 1A, 1B, and 2 include a magnetic source in only the radially inner component, either component or both components could include a magnetic source to provide or strengthen the magnetic field. While it is envisioned that most applications would include a permanent magnetic material as the magnetic source material, an electromagnetically excited material may be used as part of either or both components. Preferably, however, the moving component is not an electromagnetically excited material because of the difficulty in designing an electromagnet as a moving component. For example, in the embodiment shown in FIG. 6, stationary component 504 comprises an electromagnet 530. Electromagnet 530 comprises a core of highly magnetically permeable material 560 and a coil of wire 561 wound on the core.

In order to assemble the radial bearing assembly as shown in FIGS. 1A, 1B, and 2, radially inner component (or a rotor) is first assembled by bringing one of the pole pieces (e.g., pole piece 124a) into contact with magnetic source 120 in a sliding manner, namely by arranging the two components in their ultimate planes and then bringing them together peripherally by sliding one over the other until they are axially aligned. Second pole piece 124b is then slid over the opposing face of magnetic source 120 in the same manner to obtain a "rotor sandwich." The spindle is then placed on the rotor assembly from both sides in the form of two spindle halves and the spindle halves are attached together by fasteners (not shown) such as screws into threaded recesses. To ensure proper alignment, magnetic source 120 may have a radially-inwardly protruding notch at its center and spindle halves 124a and 124b may have corresponding recesses.

Separately, the stator housing and outer brass and magnetic ring are assembled in any known manner. One way in which to assemble these components is to place half of the outer housing 146 (i.e., housing half 147a) onto the base of an assembly fixture which has a central pin and guide plates extending upward from the base. The guide plates are attached to the base at its outer periphery and are adjustable relative to the base and abut against the outer periphery of outer housing 146 in a manner to center the bearing assembly. A brass spacer ring 150 (shown in FIG. 2) is placed on the proper surface of housing half 147a. Bearings 140a are then installed in their place in outer housing half 147a with the central pin in place. Then, the rotor assembly is then pushed into the stator (i.e., housing half 147a) past the magnetic forces and into its correct position. After bearing 147b is put in place and non-magnetic material portion 145 is put in place, the other housing half 147b is then placed over the rotor and stator and screwed into rotor sandwich with, for example, four screws extending through screw holes (not shown) in housing half 147a and into threaded recesses 154a-d of the pole pieces. Housing half 147a is screwed into these components until the tapered bearings are engaged fully, at which time the rotor is concentrically positioned with the stator. Alternatively, the parts could be assembled then magnetized.

Figure 3A:
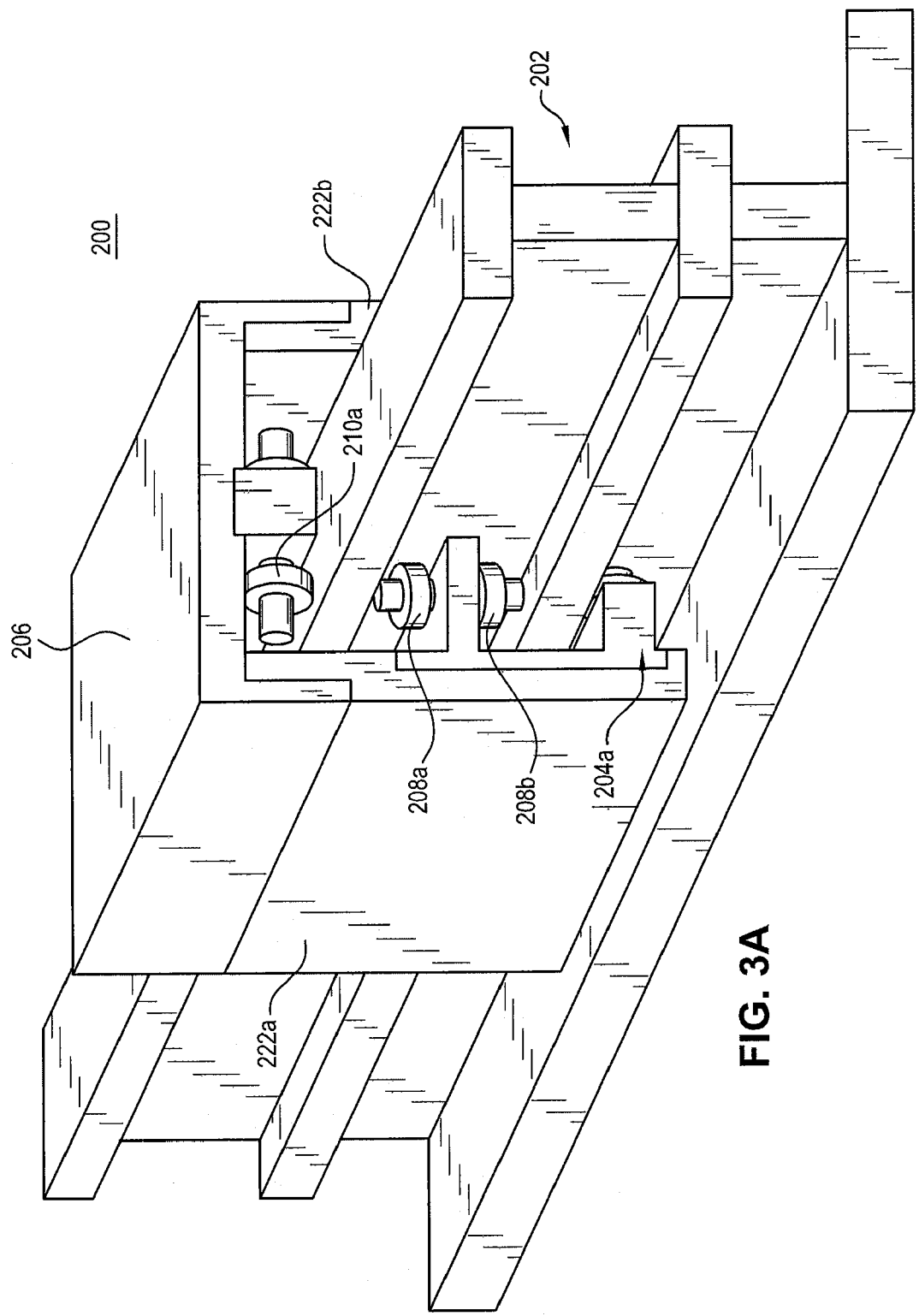
FIG. 3A is a perspective view of linear bearing assembly according to another embodiment of the invention.
Figure 3B:
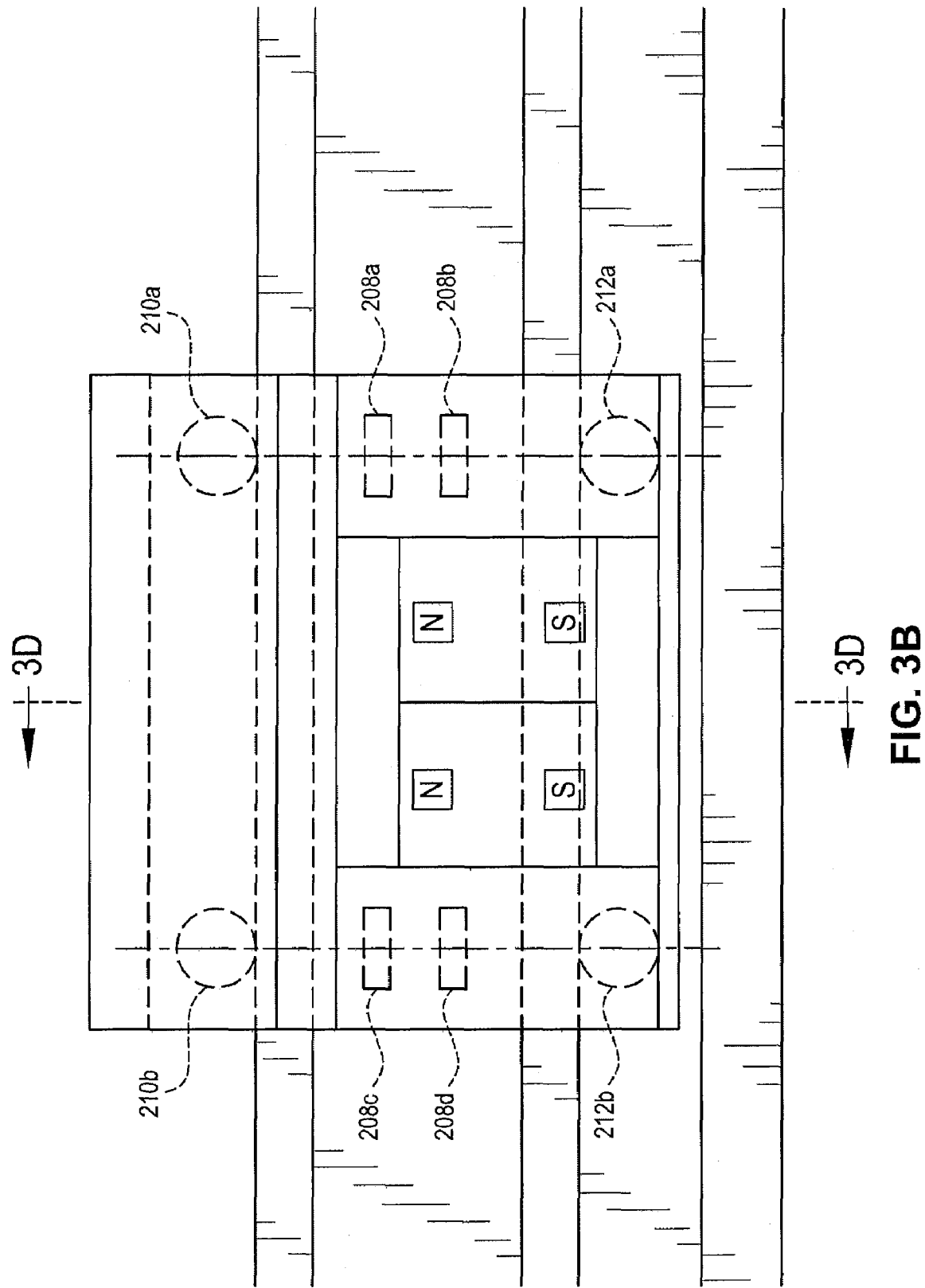
FIG. 3B is a side view of the linear bearing assembly of FIG. 3A.

Referring now to FIGS. 3A, 3B, 3C, and 3D, various views of a linear magnetic bearing assembly according to another embodiment of the present invention are shown. As shown in FIG. 3A, linear bearing assembly 200 comprises a longitudinally-extending inner component 202, two longitudinally-extending outer components 204a and 204b, housing 206 connected to each of the two outer components, and a plurality of wheels for controlling the lateral and vertical movement between the inner component and the two outer components.

Figure 3C:
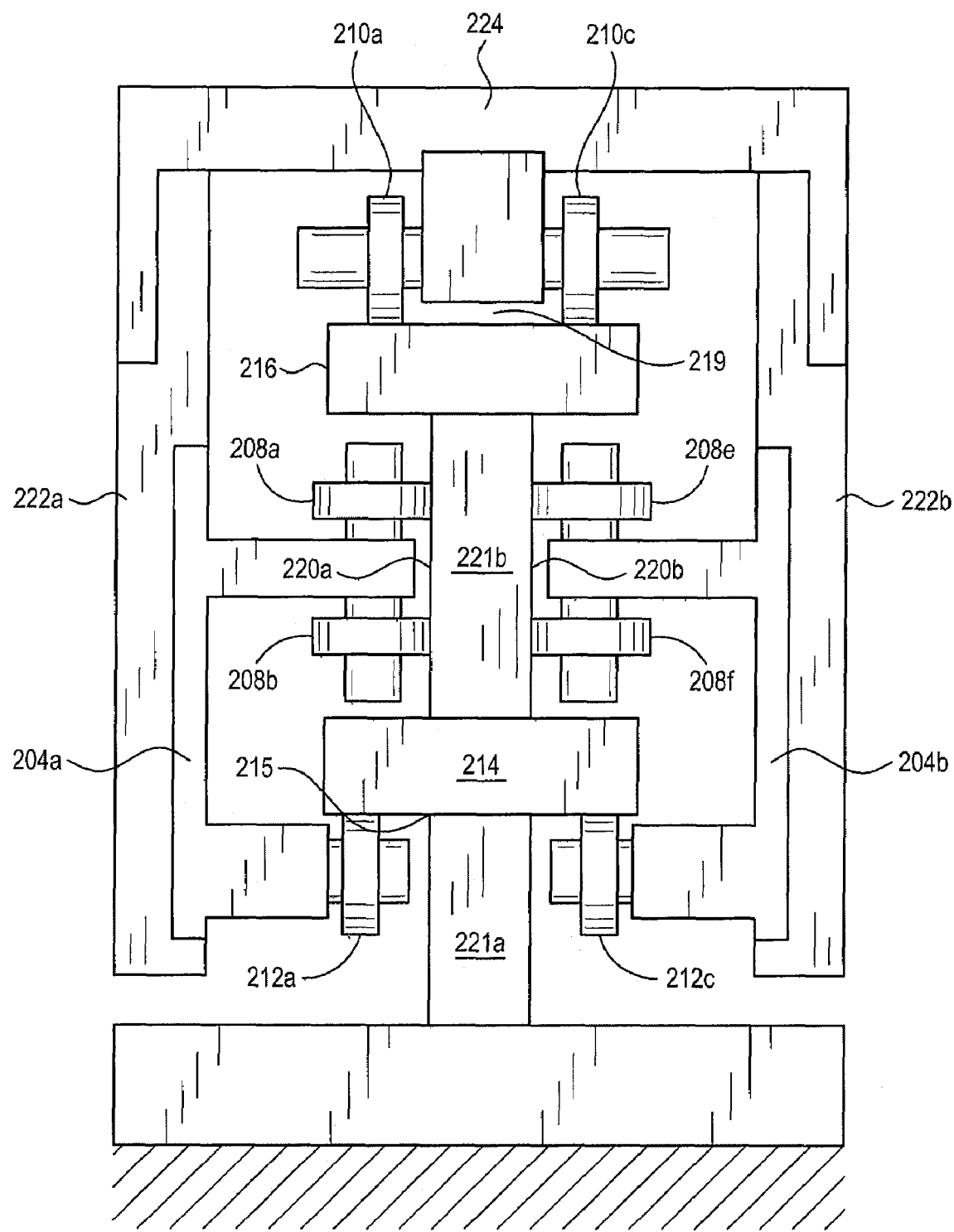
FIG. 3C is an end view of the linear bearing assembly of FIG. 3A.
Figure 3D:
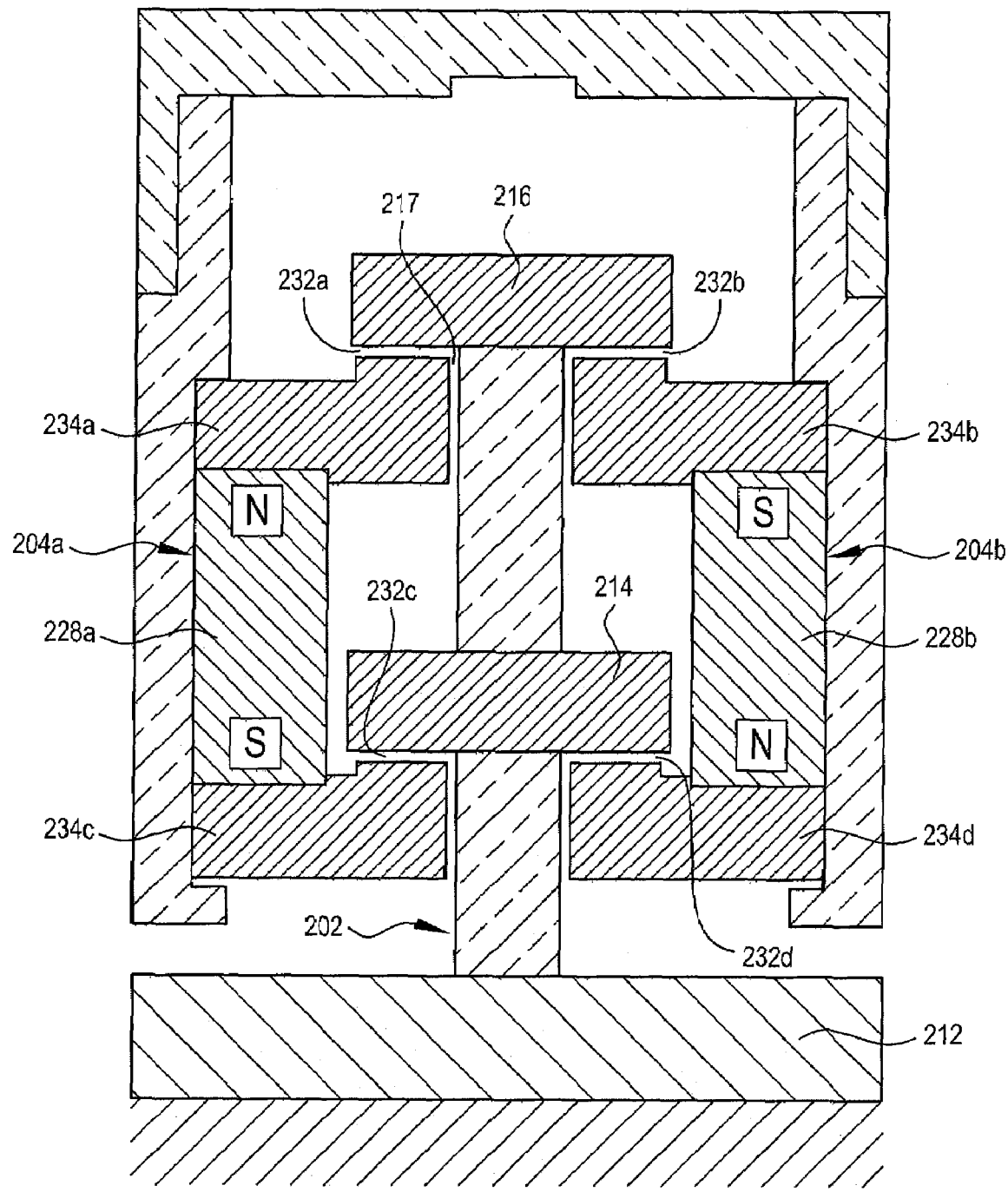
FIG. 3D is a longitudinal cross-sectional view of the linear bearing assembly of FIG. 3A along the line 3D-3D as shown in FIG. 3B.

The components which form the magnetic field are shown in FIG. 3D. Longitudinally-extending inner component 202, which is in the form of a rail, has a base 212, a first beam 221a, a first member 214 having a bottom engaging surface 215, a second beam 221b, and a second member 216 having a bottom engaging surface 217. First member 214 and second member 216 are composed of highly magnetically permeable material to conduct a magnetic field, while the beams 221a and 221b are composed of a non-magnetic material (e.g., brass) in order to maintain the magnetic field. As the material of first member 214 and second member 216 is highly magnetically permeable material, the two bottom engaging surfaces also function as magnetic surfaces. It is not essential that the magnetic surface be the same as the bottom surface or any of the other engaging surfaces, but it may be. It is important the magnetic surface of the component adapted to receive a supplemental load be positioned vertically below the other component. FIG. 3C also shows that member 216 has a top engaging surface 219. Inner component 202 also has at least two side engaging surfaces 220a and 220b. As used herein, the axis of the rail is defined as running along the length of the rail (i.e., into and out of FIGS. 3C and 3D). As shown in the embodiment in FIG. 3C, side engaging surfaces 220a and 220b are formed on the side of beam 221b, although side engaging surfaces can be a part of other areas of inner component 202.

Two longitudinally-extending outer components 204a and 204b are disposed for relative longitudinal movement with inner component 202 along the axis and each has at least one magnetic surface. While various embodiments are contemplated in which either the inner component or the two outer components is the moving component and the other is a stationary component, the embodiment shown in FIGS. 3A-3D provides that the inner component is the stationary component and the outer components are the moving components. Also, either one of the components may contain a magnetic source but, as shown in FIG. 3D, the two outer components each contain a magnetic source material. In an embodiment useful as a rail transportation system, it is preferable for the outer components to contain the magnetic source. If in such an embodiment the inner component comprised a magnetic source, then it would run the risk of attracting stray metallic objects.

In the embodiment shown in FIG. 3D, longitudinally-extending outer component 204a comprises first magnetic source 228a, and second longitudinally-extending outer component 204b comprises second magnetic source 228b. The outer components could comprise together only one magnetic source such as shown in FIG. 4B, discussed below. Magnetic sources 228a and 228b are disposed to provide magnetic moments, as shown by their polarities, north and south, and are aligned to operate in series. Any magnetic material may be used for the magnetic source as described in connection with the first embodiment. The magnetic source may include a permanent magnet material or an electromagnetically excited material, and the outer component may also either be the magnetic material or an electromagnetically excited material. In a rail transportation system, it is preferable that the magnetic source is an electromagnetically excited material.

As can be seen from FIG. 3D, inner component 202 and the two outer components 204a and 204b are positioned to provide for gaps 232a, 232b, 232c and 232d. These gaps are formed or defined by the magnetic surfaces of the two components and across the gaps a magnetic field, formed from the magnetic movement, imparts a magnetic attractive force between the two components. This attractive magnetic force causes a first load in a first direction opposing gravity to be exerted by the stationary component across the gap and against the moving component urging the moving component upward. Thus, in the embodiment shown, a magnetic field can be viewed as flowing from magnetic material 228a to first pole piece 234a, across gap 232a to member 216, then across gap 232b to second pole piece 234b, then across gap 232d across member 214 and across gap 232c, and finally across pole piece 234c and then back to magnetic material 228a. It can be appreciated that, with inner component 202 being grounded, the attractive force would urge outer components 204a and 204b and housing 206 upward, against the force of gravity.

As mentioned above, linear bearing assembly 200 also includes a housing 206 which is connected to each of the two outer components 204a and 204b for mounting the two outer components in a fixed relationship to each other while allowing for relative longitudinal movement between the two outer components and inner component 202. As shown, housing has two legs 222a and 222b, which are connected to each other along crossbar 224 and are respectively connected to outer components 204a and 204b by screws or some other fastener. Housing 206 may take any form sufficient to mount two outer components 204a and 204b in a fixed relationship to each other. Housing 206 may include or be adapted to support a carriage of a train. Thus, it can be appreciated that housing 206 is adapted to accept a supplemental component (e.g., a carriage of a train and/or passengers or cargo of a train) providing a supplemental load (or weight) opposing the first load. Varying loads could be compensated for in a number of ways, for example by adjusting the current in an electromagnet.

The means for controlling the lateral and vertical movement between the inner component and two outer components can include a wide variety of different devices for doing so. As shown in the embodiments in FIGS. 3A and 3C, such means are wheels bearing against various engaging surfaces of the longitudinally-extending inner component 202. In particular, a plurality of side wheels 208a-208f are coupled to outer components 204a and 204b and individually bear against the two side engaging surfaces 220a and 220b of inner component 202. The side wheels control the lateral movement of the outer components relative to the inner component. In addition, a plurality of top wheels 210a-210c are coupled to the outer component and bear against the top engaging surface 219 of member 216. The top wheels control vertically downward movement of the outer components relative to the inner component. A plurality of bottom wheels 212a-212c are coupled to outer components 204a and 204b and bear against bottom engaging surface 215 of member 214. Bottom wheels 212a-212c control vertically upward movement of the outer components relative to the inner component and prevent contact between the magnetic surfaces of the inner component and the outer components. The top wheels and bottom wheels set the maximum and minimum clearances of magnetic gaps 232a-232d. In addition, in view of the magnetic force exerted against outer components 204a and 204b, it can be appreciated that the frictional losses on especially top wheels 210a-210c can be greatly reduced. While the means for controlling the lateral and vertical movement are shown as wheels, other means can be used for controlling the lateral and vertical movement between the components. Such other means include flanges as discussed below in connection with FIGS. 4A and 4B.

In an embodiment of the invention, the two outer components may include two or more longitudinally offset sections. Such offset sections could be viewed as cars of a train, the side of one car being shown in FIG. 3B. Each section has one of the magnetic sources and, according to this embodiment, the direction of the polarity of the magnetic source is opposite in adjacent sections. In other words, the next section or car adjacent the one shown in FIG. 3B would have north at the bottom and south at the top. This configuration serves to demagnetize the inner component or rail or at least limits the magnetism induced on the track.

Figure 4A:
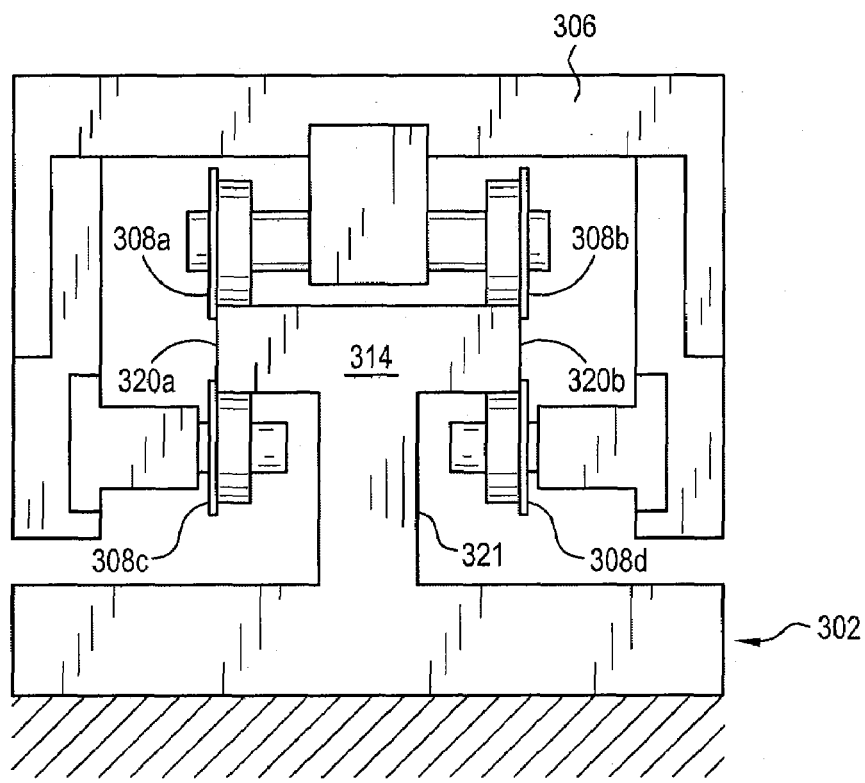
FIG. 4A is an end view of a linear bearing assembly according to another embodiment of the invention.
Figure 4B:
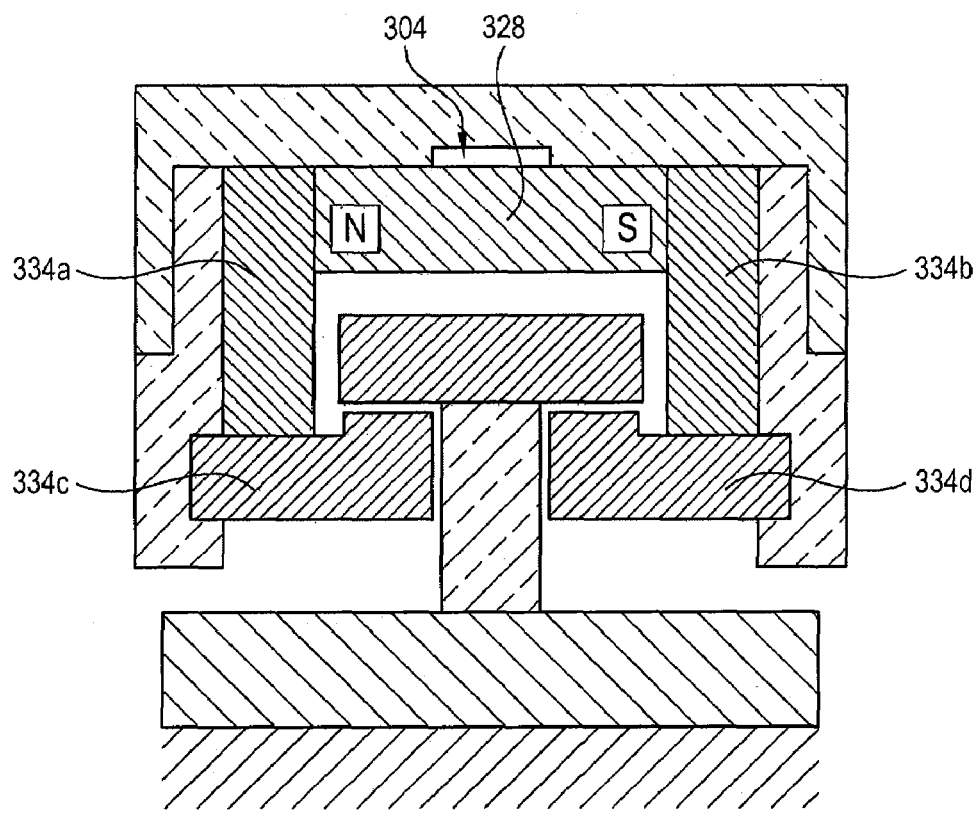
FIG. 4B is a longitudinal cross-sectional view of the linear bearing assembly of FIG. 4A.
Figure 5A:
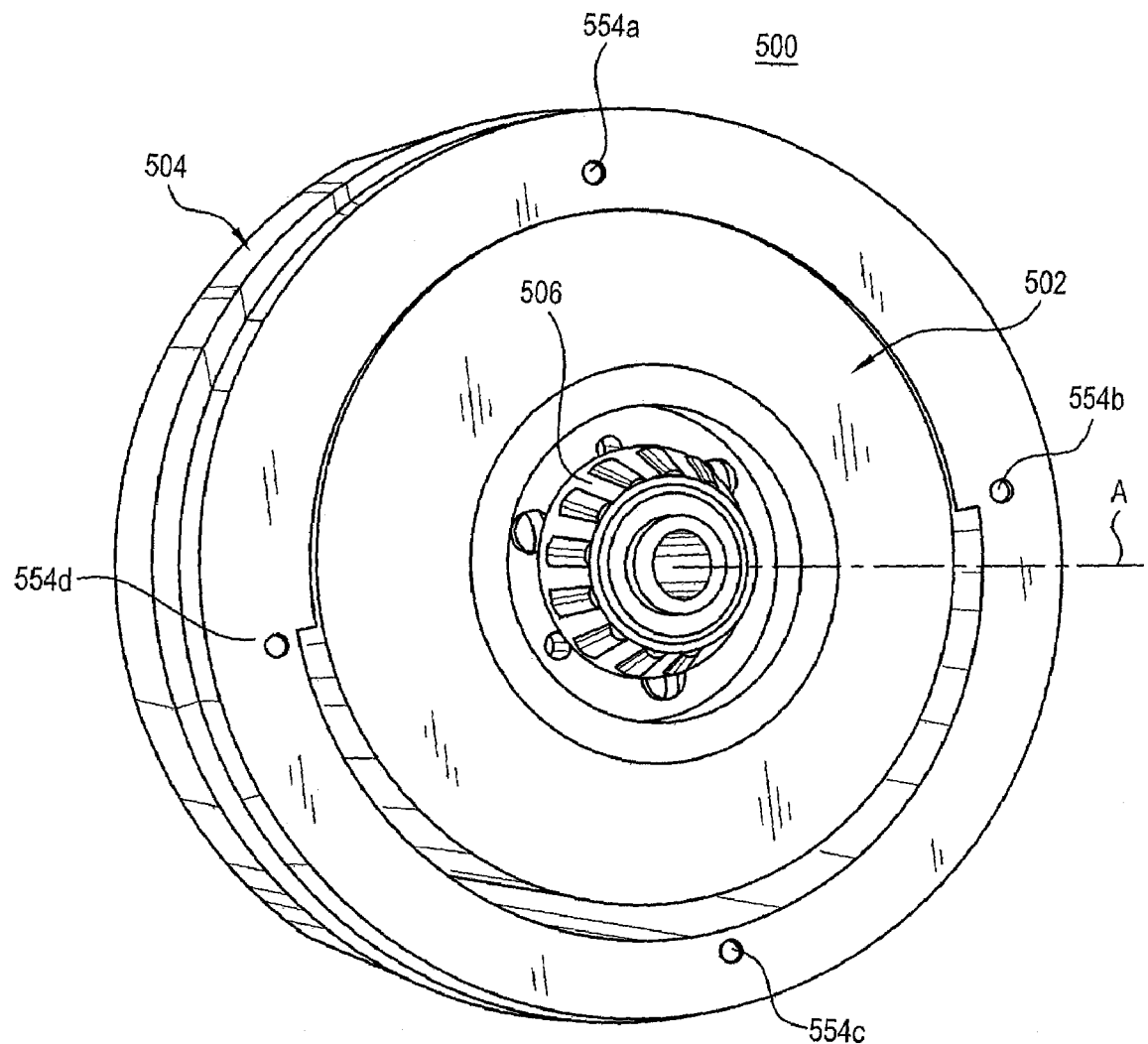
FIG. 5A is a perspective view of certain parts of a radial bearing assembly according to another embodiment of the present invention without the mechanical bearing acting on the magnetic components.
Figure 5B:
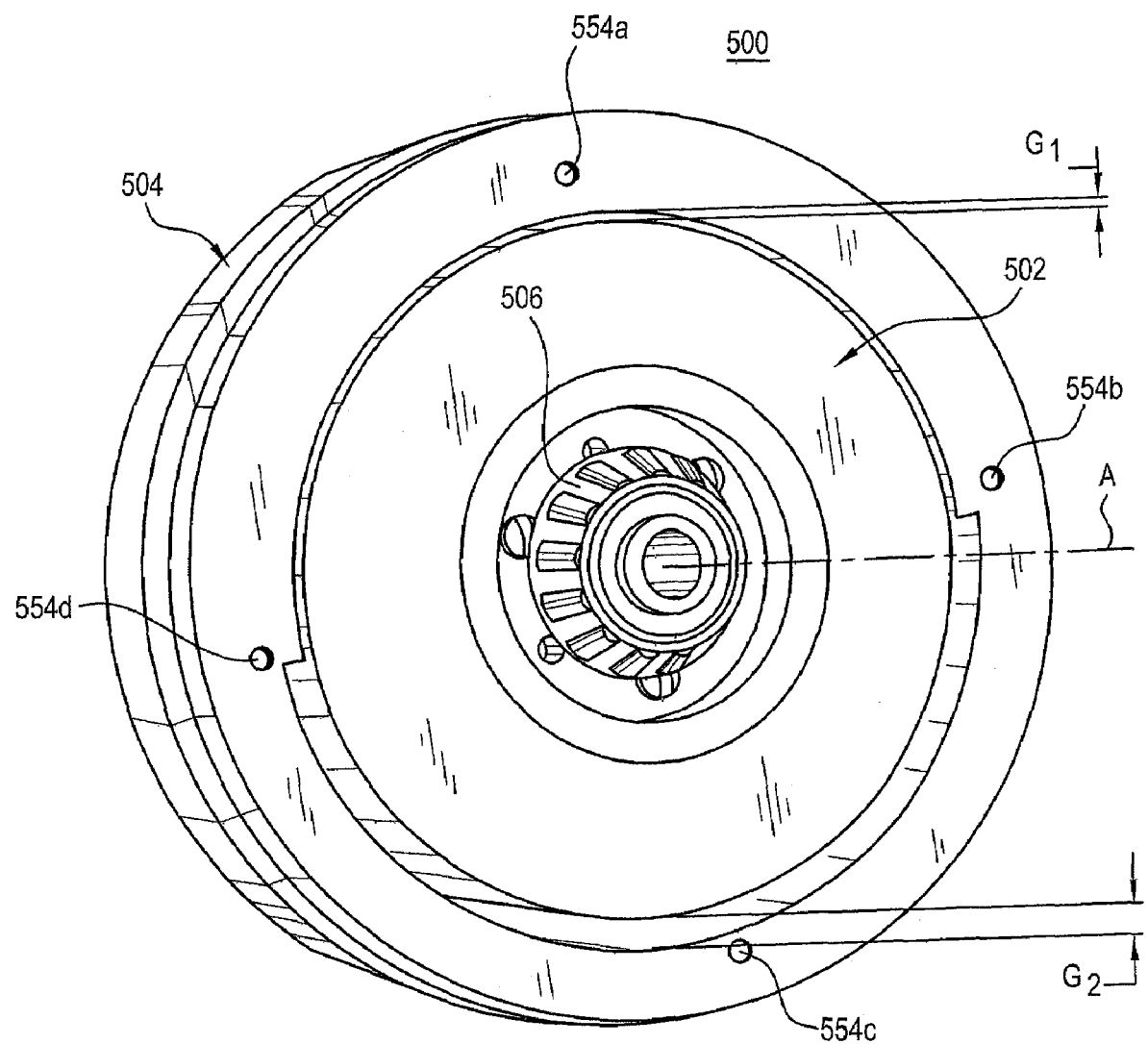
FIG. 5B is a perspective view of the same parts of the radial bearing assembly shown in FIG. 5A but showing how the mechanical bearings influence the magnetic components of the radial bearing assembly.
Figure 5C:
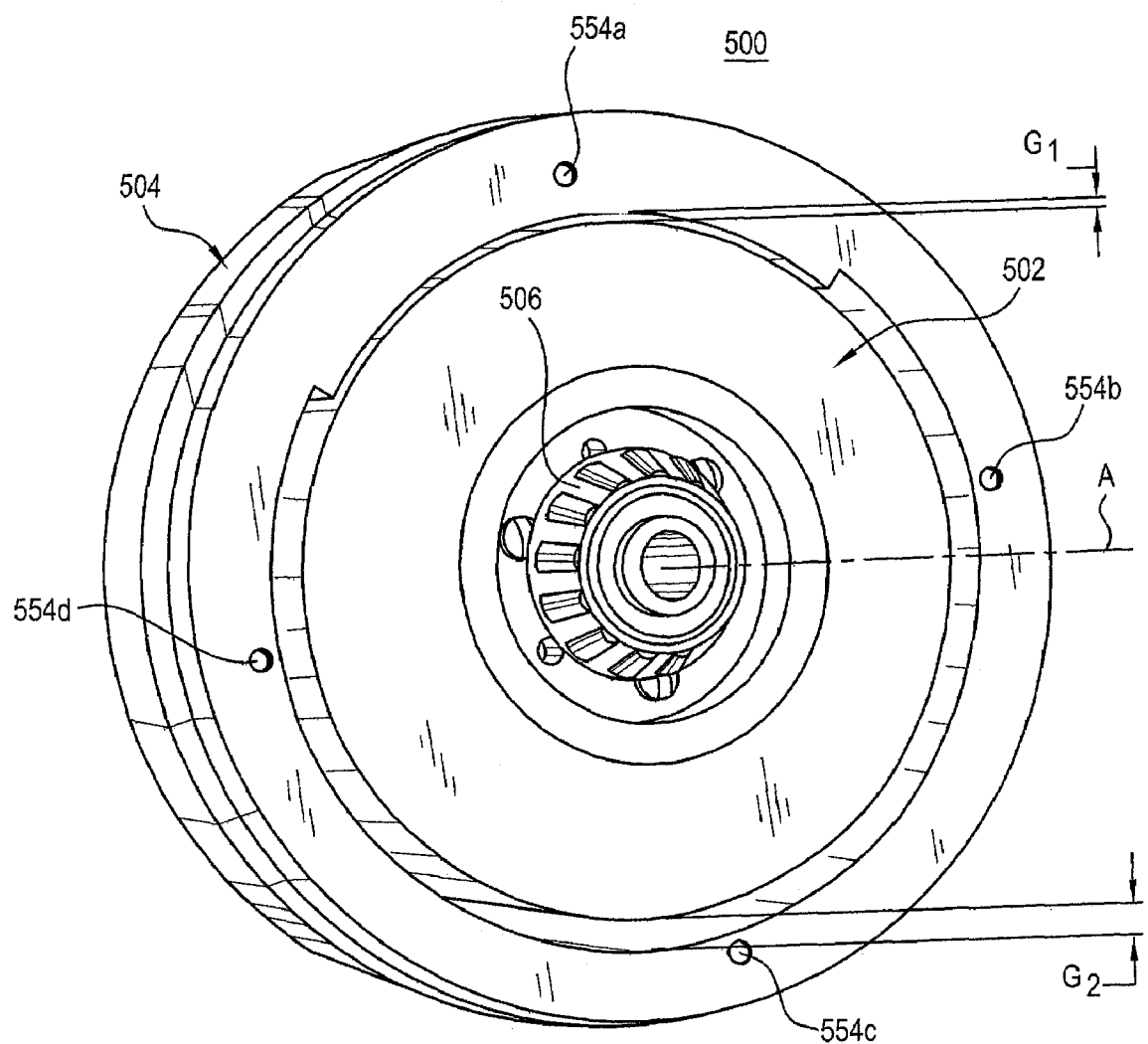
FIG. 5C is a perspective view of the same parts of a radial bearing assembly of yet another embodiment, showing how the mechanical bearings influence the magnetic components of the radial bearing assembly.
Figure 6:
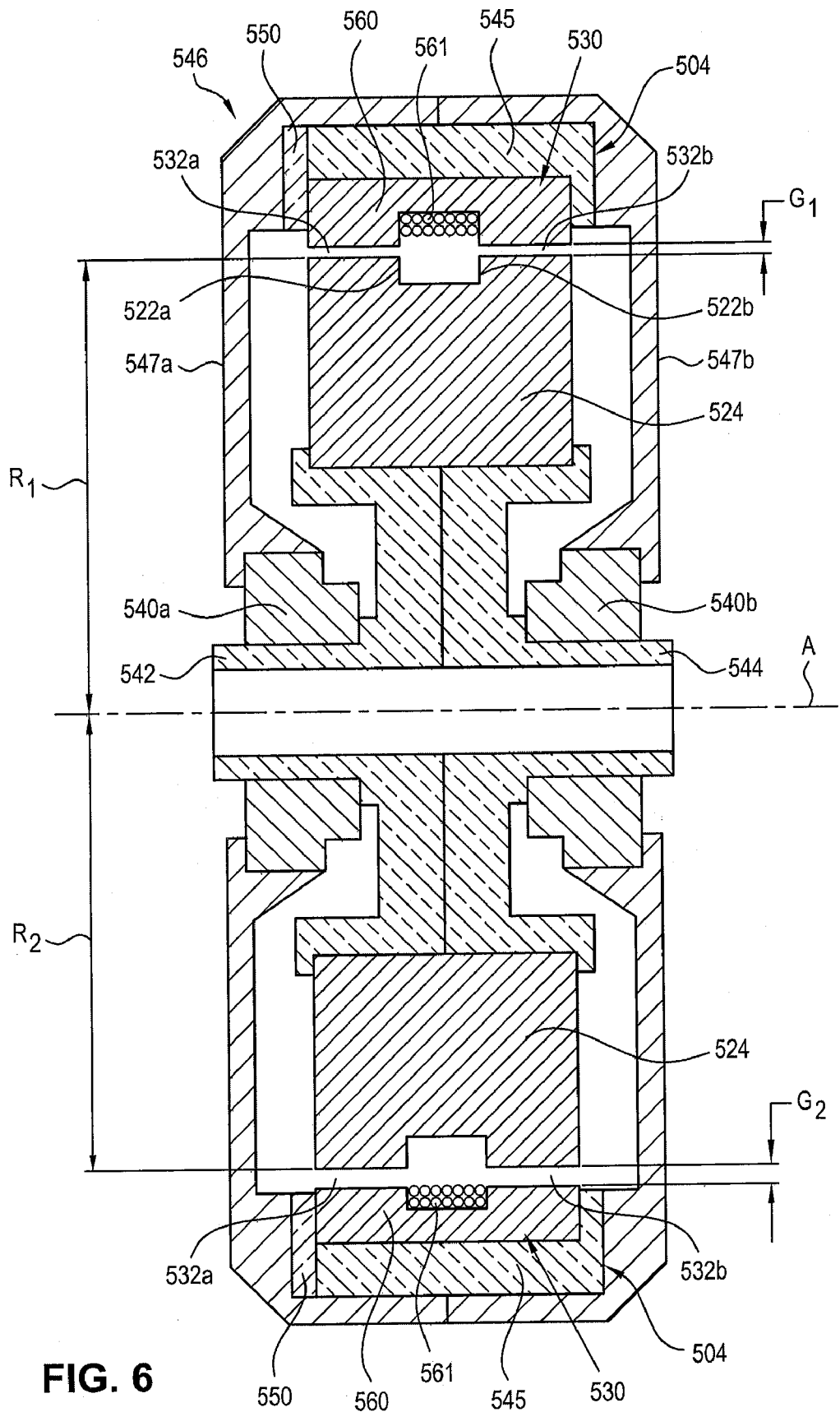
FIG. 6 is a radial cross-sectional view of the radial bearing assembly incorporating the parts shown in FIGS. 5A, 5B, and 5C.

The embodiment shown in FIG. 4A is similar to the embodiment shown in FIGS. 3A-3D except that the bearing assembly has only one outer component and the inner component 302 only has one beam 321 and one member 314. Another distinction of this embodiment is that the outer component 304 comprises the magnetic source which provides a magnetic moment in a direction generally transverse to the axial direction. Outer component 304 has a first pole piece 334a in magnetic contact with the magnetic source at a first end having a first polarity (north) and a second pole piece 334b in magnetic contact with the magnetic source at a second end having a second polarity (south) opposite the first polarity. While in the embodiment shown in FIG. 4B outer component 304 has additional pole pieces 334c and 334d to complete the magnetic circuit, such pole pieces could be formed integrally with pole pieces 334a and 334b, respectively. As in the previous embodiment, the pole pieces are made of a highly magnetically permeable material, and member 314 of inner component 302 is also composed of a highly magnetically permeable material. In the embodiment shown in FIG. 4A, the means for controlling the lateral movement between inner component 302 and the outer component 304 comprise two flanges 308a and 308b extending from and mounted to housing 306. Each flange 308a and 308b respectively engages side engaging surfaces 320a and 320b of inner component 302. Although not shown, a drive wheel or gear may extend from housing 306 and engage inner component 302 and a brake pad may also extend from the housing to engage the inner component when braking.

In an alternative embodiment of the linear bearing assembly according to the present invention, the system may be used upside down, namely with the outer components grounded and elongated and the inner component adapted for movement along the outer components.

A linear bearing assembly according to the present invention can be assembled in any number of ways. For example, a longitudinally inner component is first formed. Separately, longitudinally outer components and housing can then be assembled along with the wheels or bearings for controlling lateral and vertical movement of the components relative to one another. After assembling the components, the housing with the two components can be slid onto one end of the inner component. Thereafter, a stop may be placed on the ends of the inner component. Alternatively, the parts could be assembled then magnetized.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed is:

1. A radial bearing assembly comprising:
   a radially inner component having an axis, wherein the radially inner component is a rotating component and is adapted to receive a supplemental load;
   a radially outer component, wherein the radially inner component is disposed for relative rotation within the radially outer component around the axis, wherein:
   (a) the radially outer component is a stationary component;
   (b) at least one of the radially inner component and the radially outer component comprises a magnetic source and the other component comprises a highly magnetically permeable material;
   (c) the radially inner component and the radially outer component are positioned to provide at least one annular gap across which a magnetic field, formed from the magnetic moment, imparts a magnetic attractive force between the radially inner component and the radially outer component; and
   (d) the radially outer component has a reduced annular height at its lower quadrant such that the at least one annular gap is wider at the bottom quadrant than at the top quadrant;
   a set of mechanical bearings coupled to the radially inner component and the radially outer component for allowing relative rotation between the radially inner component and the radially outer component and for axially aligning the radially inner component and the radially outer component, wherein the radially inner component and the radially outer component are configured to exert against the set of mechanical bearings a first load in a first direction opposing gravity exerted across the at least one annular gap and against the supplemental load received by the radially inner component; and
   means, attached to the radially inner component, for accepting a supplemental component providing the supplemental load on the radially inner component in a second direction opposite the first direction to oppose the first load.

2. An assembly according to claim 1, wherein the supplemental component is a fly wheel.

3. An assembly according to claim 1, wherein the radially outer component comprises the magnetic source.

4. An assembly according to claim 3, wherein the magnetic source is an electromagnet.

5. An assembly according to claim 4, wherein the electromagnet comprises a core of highly magnetically permeable material and a coil of wire wound on the core, wherein the core is magnetized by passing a current through the coil of wire.

6. An assembly according to claim 3, wherein the radially inner component consists of the highly magnetically permeable material.

7. An assembly according to claim 1, wherein the means for accepting the supplemental component comprise a shaft, wherein the shaft is attached to the radially inner component by a spindle.

8. An assembly according to claim 7 further comprising a housing coupled to the radially outer component and wherein the set of mechanical bearings comprise a pair of tapered roller bearings each extending between the housing and the spindle.

9. An assembly according to claim 1, wherein the bottom quadrant comprises up to one half of the arc of the gap.

10. An assembly according to claim 1, wherein the bottom quadrant comprises up to one quarter of the arc of the gap.

11. An assembly according to claim 1, wherein the bottom quadrant comprises about one half of the arc of the gap.

12. An assembly according to claim 1, wherein the bottom quadrant comprises about one quarter of the arc of the gap.

* * * * *